(12) United States Patent
Sykes et al.

(10) Patent No.: US 11,444,393 B2
(45) Date of Patent: Sep. 13, 2022

(54) OVERHEAD GROUNDING DEVICE

(71) Applicant: Meta Design & Manufacturing, Inc., Vallejo, CA (US)

(72) Inventors: Bradley Sykes, Mill Valley, CA (US); Phil Hawtin, Lodi, CA (US); James Coleman, Benicia, CA (US); Gabe Dowdy, Vacaville, CA (US); Aaron Boone, Benicia, CA (US)

(73) Assignee: META DESIGN & MANUFACTURING INC., Vallejo, CA (US)

( * ) Notice: Subject to any disclaimer, the term of this patent is extended or adjusted under 35 U.S.C. 154(b) by 0 days.

(21) Appl. No.: 17/249,891

(22) Filed: Mar. 17, 2021

(65) Prior Publication Data
US 2021/0296800 A1 Sep. 23, 2021

Related U.S. Application Data

(60) Provisional application No. 62/990,772, filed on Mar. 17, 2020.

(51) Int. Cl.
| H01R 4/66 | (2006.01) |
| H02G 1/02 | (2006.01) |
| H01R 11/15 | (2006.01) |
| B25B 5/16 | (2006.01) |
| H01R 4/64 | (2006.01) |

(52) U.S. Cl.
CPC ............... *H01R 4/66* (2013.01); *B25B 5/16* (2013.01); *H01R 4/643* (2013.01); *H01R 11/15* (2013.01); *H02G 1/02* (2013.01)

(58) Field of Classification Search
CPC .............................. H01R 11/14; H01R 11/15
See application file for complete search history.

(56) References Cited

U.S. PATENT DOCUMENTS

| 10,128,582 | B2 * | 11/2018 | Diop | H01R 4/363 |
| 10,490,913 | B2 * | 11/2019 | De France | H01R 11/15 |
| 10,686,266 | B2 * | 6/2020 | Rahman | H01R 11/14 |
| 10,749,280 | B2 * | 8/2020 | Oostdyk | H01R 43/00 |
| 11,024,992 | B2 * | 6/2021 | Diop | H01R 4/38 |

* cited by examiner

Primary Examiner — Ross N Gushi

(57) ABSTRACT

A grounding clamp having a conductive clamp body with an upper jaw and a lower portion with a through hole. A lower portion chamber includes an activator pivotally mounted on an axle. The activator includes a partially threaded upper pawl portion and a lower bar. An eyebolt with a threaded rod is slidingly disposed in the throughhole. A spring also mounted on the axle, urges the threads on the activator into engagement with the eyebolt rod. A conductive head is disposed on the upper end of the eyebolt, while a latching element is on the lower end. Pushing the activator lower bar pivots the activator and disengages the pawl from the threaded rod so that the threaded rod slides in the through hole freely until the conductive head engages a conductor. The clamp is easily tightened by turning the eyebolt and easily disengaged with only minimal reverse turning.

14 Claims, 4 Drawing Sheets

OVERHEAD GROUNDING DEVICE

CROSS REFERENCES TO RELATED APPLICATIONS

The present application claims the benefit of the filing date of U.S. Provisional Patent Application Ser. No. 62/990,772, filed Apr. 1, 2020 (Apr. 1, 2020).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates most generally to tools for use in medium to high power electrical distribution systems, and more particularly to devices for grounding medium voltage to high voltage overhead electrical distribution lines. Still more particularly, the present invention relates to an ergonomically advantageous overhead power line grounding device that improves the safety and convenience of temporary grounding devices in several ways. Among its many advantages, the inventive device increases safety, reduces fatigue, increases efficiency in installing the devices in the field, reduces overuse injuries, increases connection strength, reduces operational costs.

Background Discussion

In the overhead electrical power line environment, linemen are working either from a boom lift bucket raised up to 100 ft in the air by a boom truck, or they must climb a power pole and strap themselves to the pole to work on overhead wires supported on cross arms cantilevered from the pole (FIG. 5). Exposed to the elements, suspended high in the air, and working close to high voltage wires which, in some cases, are live—i.e., having current flowing through them—any small mistake can be life threatening. Minimizing the number of tasks and physical motions can significantly reduce fatigue and thereby reduce mistakes and exposure to the risk of injury and death.

Most grounding tool manufacturers presently provide variations on "duckbill" temporary protective grounds—aka ground jumpers. The devices provide an equipotential zone at the worksite by providing a low impedance path to ground. They are placed on lines as an extra safety precaution after the lines have first been de-energized.

However, prior art temporary grounding tools typically require multiple rotations to secure the devices, up to as many as 15 supinations, for safe installation and 15 pronations for removal.

FIGS. 1a-1b show a prior art overhead spring-loaded snap-on "duckbill" ground clamp for use with a dielectric hotstick of the kind shown in FIG. 2. As can be seen, such an overhead grounding device includes a housing 4 (typically a cast aluminum body). When the clamp is installed on a power line—element 2 in each of the views—an adjustable jaw 1 pivotally coupled to the housing at a pivot point securely captures the line and urges it against, and thus into electrical contact with, the aluminum housing 4. The housing includes an integral crimp style ring into which a ground cable 8 is terminated, the cable insulated in dielectric material 28 (often a shrink-wrap thermoplastic). The ground cable provides a low impedance conductive path to ground. Piston travel and opening dimensions can be adjusted using the threaded eyebolt 7, to set the top end 3 at a predetermined depth withing the housing. The eyebolt is also twisted using the hotstick both during installation to provide a completely secure connection and then again during clamp removal.

As can be seen, the adjustable jaw 1 is urged by a spring 5 driving a piston 6 upwardly and against the jaw to rotate it into a closed position with the conductor 2 approximated to the conductive housing body 4.

Using a hotstick of the kind shown in FIG. 2, prior art grounding devices require up to fifteen 90-degree rotations of the hotstick to secure the device to an overhead power distribution line. Reverse motions are required to loosen the device for removal.

Looking at FIG. 5, one will readily appreciate the kinds of repetitive motions required and the forces needed to secure the conventional device (though, as will be explained, such repetitive motions are obviated when using the present invention). Combinations of repeated supination and pronation of the hand (FIG. 6) originating at the elbow, as well as circumduction, flexion and extension, and to a lesser degree radial and ulnar flexion, all originating at the wrist, are required, all applied with considerable force. These repetitive motions place considerable strain on the arms and wrists and shoulders of the user.

Overhead high voltage power lines must be turned off and grounded safely before any repairs or improvements are made. For overhead wire a "duckbill" grounding clamp (FIGS. 1a-1b) is the industry standard used to create the necessary equipotential work zone by clamping onto a wire or phase conductors (FIG. 5), thereby routing a potentially injurious electrical surge through another wire or grounding jumper to a neutral conductor or ground. Linemen are highly trained technicians that routinely complete these hazardous tasks. To mitigate hazards, they wear heavy rubber gloves, rubber sleeves, and helmets, all while manipulating and interacting with clamps using a "hotstick" (FIG. 2). The industry standard hotstick is a six-foot-long fiberglass pole with a dynamic latching hook used like a wrench to tighten or release many different industry devices that have steel eyes or hooks to receive the hook.

Different manufacturers produce variations of the same devices, but each include the shortcomings addressed by the overhead ground clamp of the present invention. Summarily, there is to date no known solution that achieves the advantageous features present in the overhead ground tool of the present invention, as will be appreciated by reference to FIGS. 3 & 4 and the corresponding narrative set out below.

SUMMARY OF THE INVENTION

The present invention improves the safety and convenience of temporary grounding devices in several ways. Among its many advantages, the inventive overhead grounding device increases safety, reduces fatigue, increases efficiency in installing the devices in the field, reduces overuse injuries, increases connection strength, reduces operational costs.

The present invention achieves its safety and ergonomic advantages by significantly reducing the repetitive motions involved in overhead grounding operations, including supination and pronation of the forearm, as well as elevation and concurrent internal and external rotation of the arm at the shoulder. Wrist and forearm overuse injuries are reduced, as are rotator cuff injuries and shoulder strain. The inventive overhead grounding tool includes a large hook feature that promotes easy landing and removal from lines, whereas the landing and removal of prior art clamps can be difficult. Using the present invention, a single full rotation, two supinations of the forearm can safely secure the device to any size wire. The present invention thereby improves the safety and convenience of these clamps by improving operation ergonomics, efficiency, and strength.

In its most essential aspect, the present invention provides a method for grounding overhead conductors. The device may be characterized as a grounding clamp configured for operative connection to a shotgun style non-conductive (insulator) hotstick having a dynamic latching hook for capturing and operably engaging an eyelet of a grounding clamp eyebolt. The inventive grounding clamp includes a conductive clamp body with an upper jaw and a lower portion with a through hole. A chamber in the lower portion includes an activator pivotally mounted on an axle acting as a fulcrum. The activator includes a partially threaded upper pawl portion and a lower bar. An eyebolt with a threaded rod is slidingly disposed in the throughhole. A spring, also mounted on the axle, urges the threads on the partially threaded pawl portion of the activator into engagement with the eyebolt threaded rod. A conductive (slider) head is disposed on the upper end of the eyebolt, while a latching element, typically an eyelet or ring, is on the lower end. Pushing the activator lower bar pivots the activator and disengages the threaded pawl from the threaded rod so that the threaded rod slides in the through hole freely. It will slide until the conductive head engages a conductor. The clamp is easily tightened by turning the eyebolt and easily disengaged with minimal reverse turning.

BRIEF DESCRIPTION OF SEVERAL VIEWS OF THE DRAWINGS

FIG. 4c is a cross-sectional side view of the embodiment of FIG. 4a;

DETAILED DESCRIPTION OF THE INVENTION

Figure 1A:
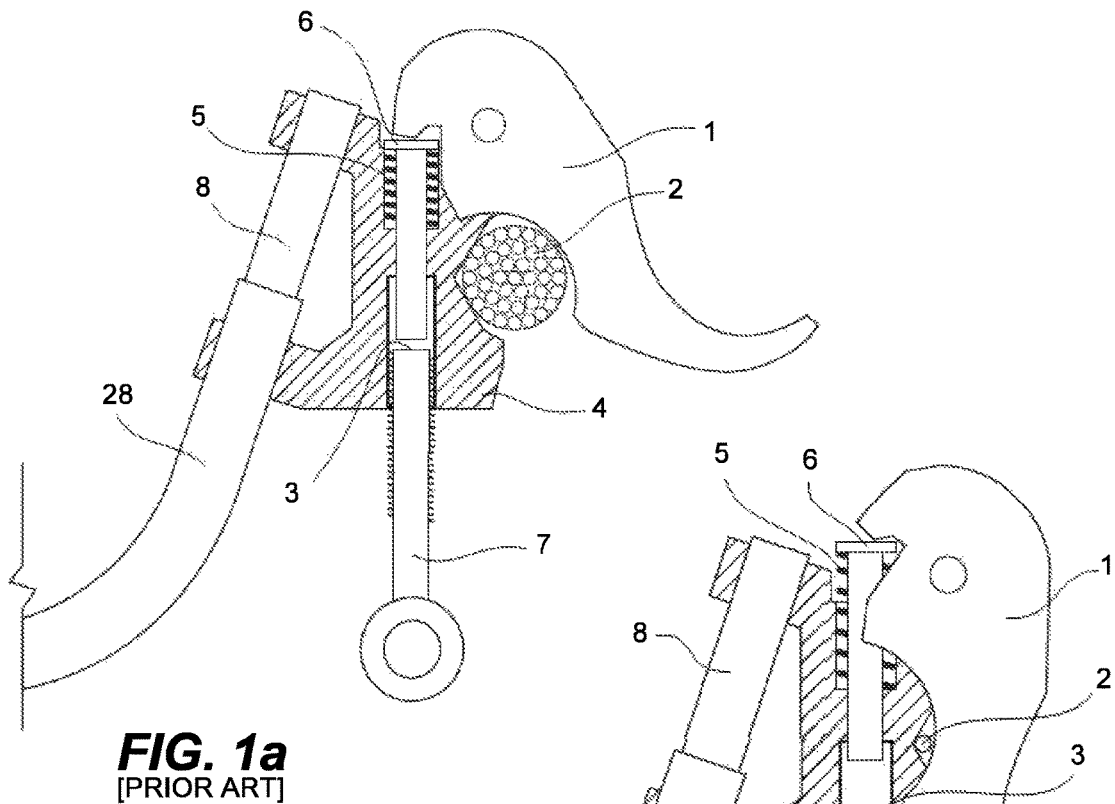
FIG. 1a is a schematic side view in elevation of a prior art overhead "duckbill" grounding device clamped onto a large diameter multiconductor [33(13+20)+7(1+6)] overhead power distribution line.
Figure 1B:
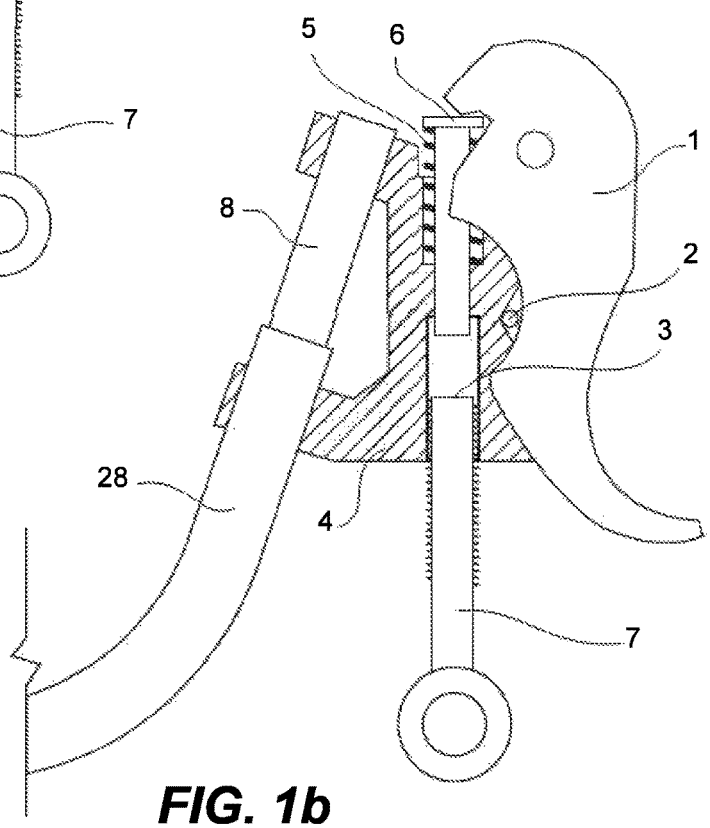
FIG. 1b is the same view showing the prior art grounding device clamped on a small diameter single conductor power line.
Figure 2:
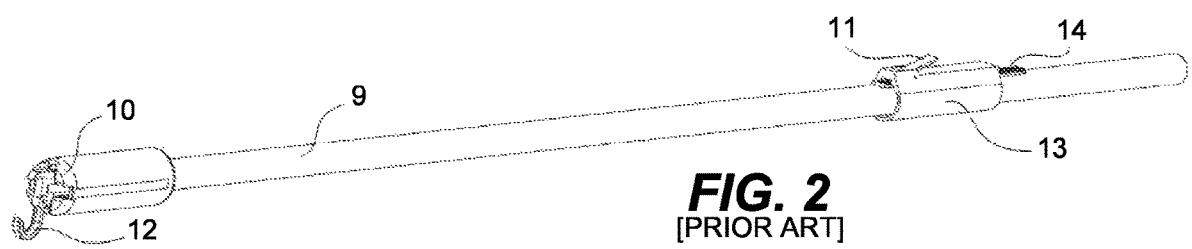
FIG. 2 is a perspective view showing a hotstick used for disconnecting and connecting separable connectors and temporary ground devices.
Figure 3A:
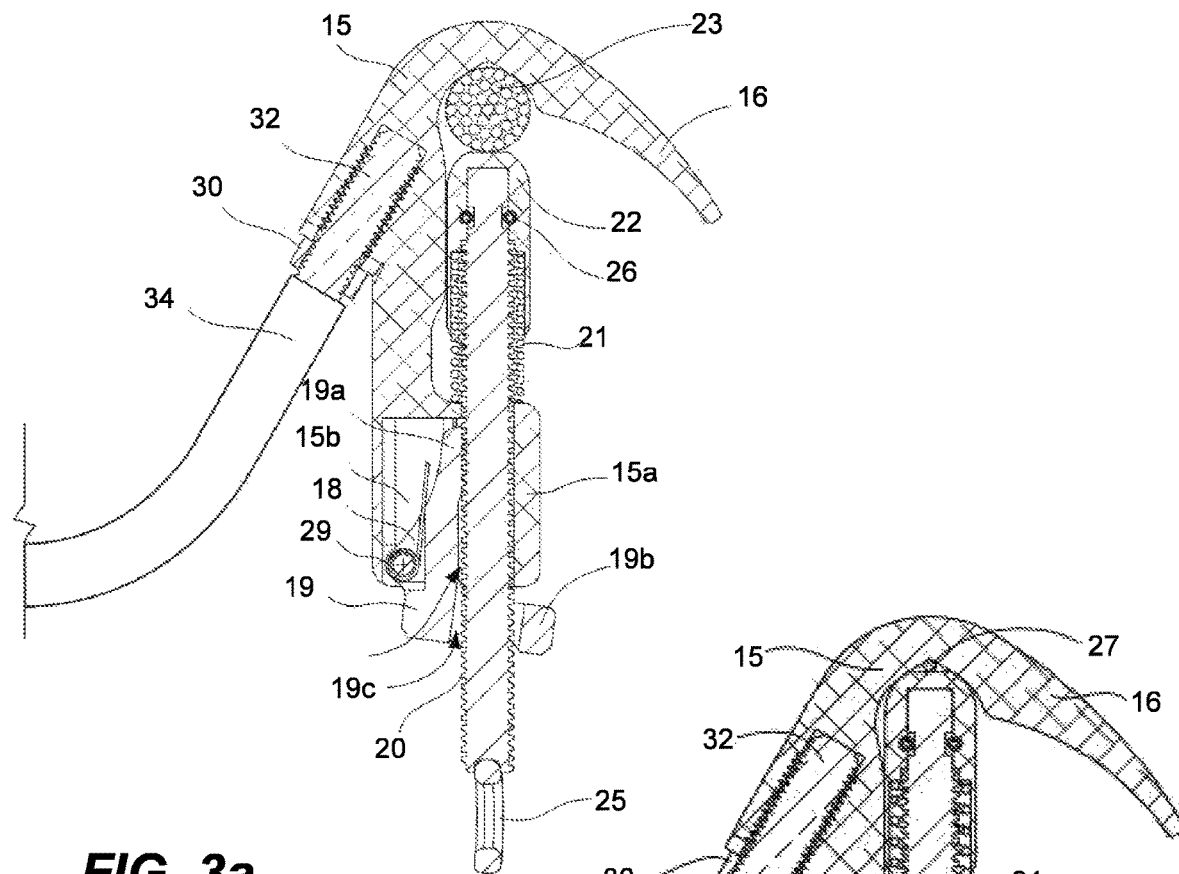
FIG. 3a is a side view in elevation showing the overhead grounding device of the present invention clamped onto a large diameter power distribution line.

Referring now to FIGS. 2 and 3, in an exemplary embodiment of the present invention, the grounding clamp is configured for installation on the end of a hotstick of the kind shown in FIG. 2. In such exemplary embodiments, the above-mentioned ergonomic advantages are realized in a design (FIGS. 3a-4c) that incorporates a unique mechanical relationship between the clamp and the hotstick of FIG. 2.

The ground clamp of the present invention includes a conductive clamp body 15, preferably machined aluminum, with a lower portion 15a having an open chamber 15b and an unthreaded bore hole (throughbore) 15c. An eyebolt 20 having a ring, eyelet, or partial annulus 25 is disposed on a lower end of the eyebolt threaded rod 20a, while a conductive clamp lower jaw (or slider head) 22 is disposed on the upper end and secured with retaining pins 26. The clamp body 15 includes an integral crimp style ring 30 into which a ground cable 32 is terminated. As is customary, the cable is wrapped in insulating/non-conductive material 34.

The chamber 15b in the lower portion 15a of the clamp body 15 includes an axle 29 on and around which are disposed both a torsion spring 18 and a pivotally coupled activator 19. The activator 19 is L-shaped when viewed from the side (see FIGS. 3a-3b) and includes a stem portion 19a and an integral lower bar 19b. The lower bar includes a throughhole 19c. The stem includes a partially threaded pawl portion 19d. As can be seen in the views, the lower bar 19b is disposed below the lower portion 15a of the clamp body 15.

In selected hotstick configurations during operation (when the slidable components of the hotstick are properly configured, as described more fully below), the torsion spring 18 urges the pawl toward the eyebolt threaded rod 20a, such that the threads of the partially threaded pawl portion 19d engage the threaded rod 20a. The partially threaded pawl portion 19a is the only threaded portion of the clamp body that engages the threaded rod 20a of the eyebolt 20. Thus, disengagement of the complementary threads enables the eyebolt to slide within the throughbore 15a until the partial pawl portion reengages the threads on the eyebolt.

Figure 3B:
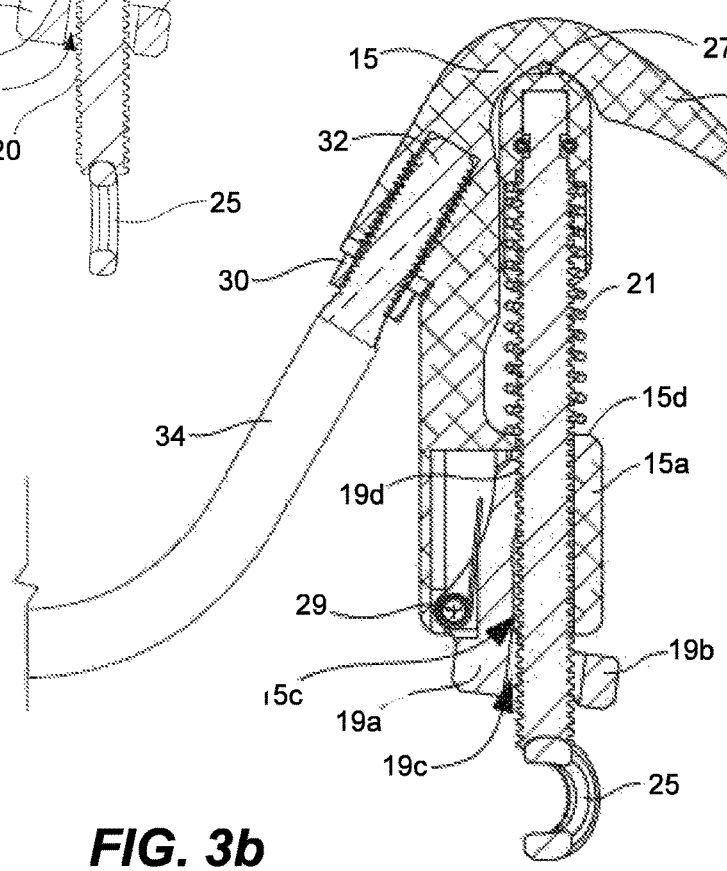
FIG. 3b is the same view showing the inventive tool clamped onto a small diameter line.

As can be seen, and as is well known in the art, the hotstick includes a fiberglass (insulator) pole 9, a plastic housing with a clamp mating surface 10, and a sliding handle 13 with a ratcheting trigger 11 system disposed on a linear pawl 14. The sliding handle engages an articulating hook 12, which rotates to hook onto a clamp eyelet 25 of a threaded eyebolt 20 of the grounding clamp. The eyelet may be annular (FIG. 4b) or semi-annular (FIGS. 3a-3b). This kind of hotstick is known as a "shotgun style hotstick," or simply "a shotgun stick."

As previously noted, the activator 19 is configured with an upper stem 19a having a partially threaded pawl portion 19d that selectively engages the side of threaded rod of the eyebolt 20. Also as previously noted, the activator 19 is pivotally connected to an axle in the lower portion 15a of the clamp body on an axle 29, around which a leaf torsion spring is wound to urge the pawl teeth of the partially threaded portion 19d of the activator 19 into mating engagement with the eyebolt threaded rod 20 when the mating surface 10a of the hotstick is spaced apart from the activator bar 19b. The activator bar includes a hole 19c through which the threaded rod passes.

Figure 4A:
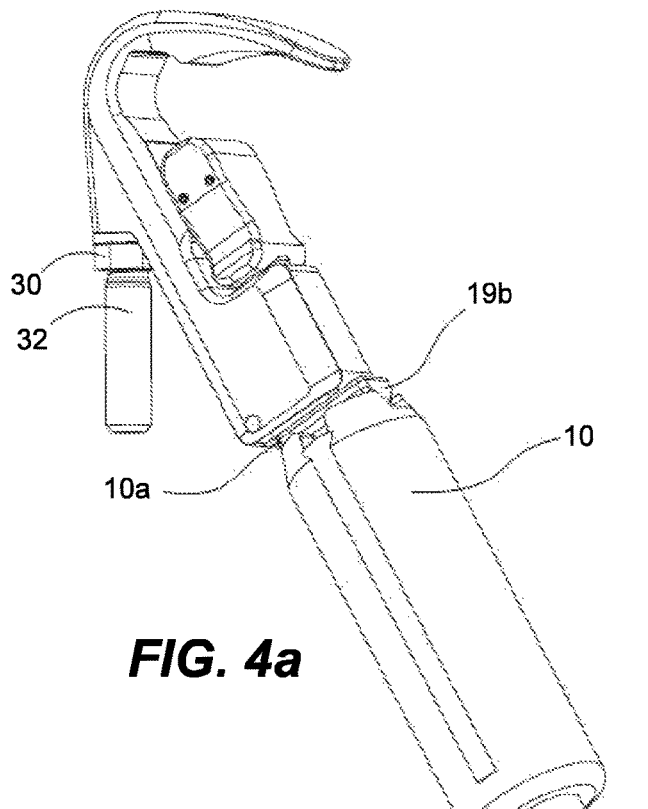
FIG. 4a is a perspective view of the overhead grounding device of the present invention disposed on the upper end of a hotstick.
Figure 4B:
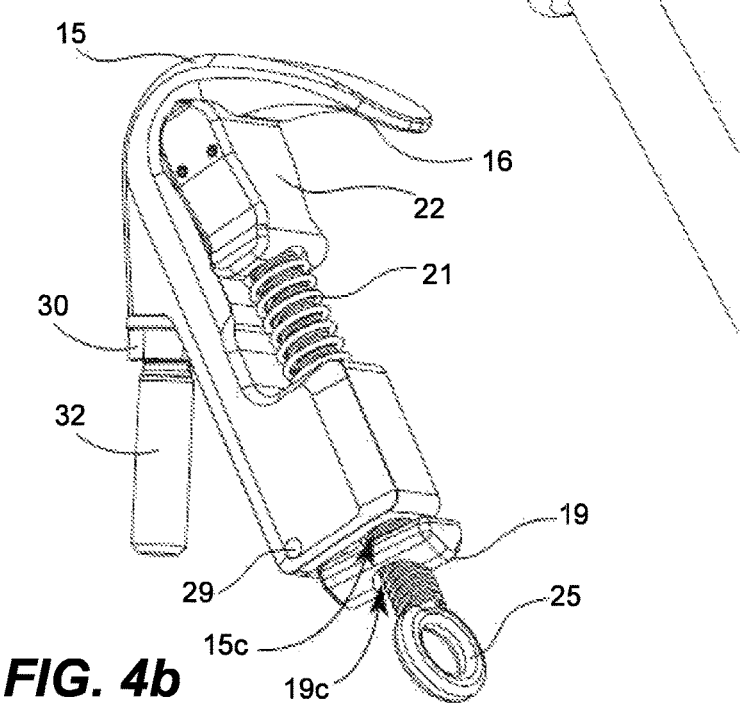
FIG. 4b is a perspective view showing the grounding clamp separated from the hotstick and featuring an annular eyelet on its threaded eyebolt handle.
Figure 4C:
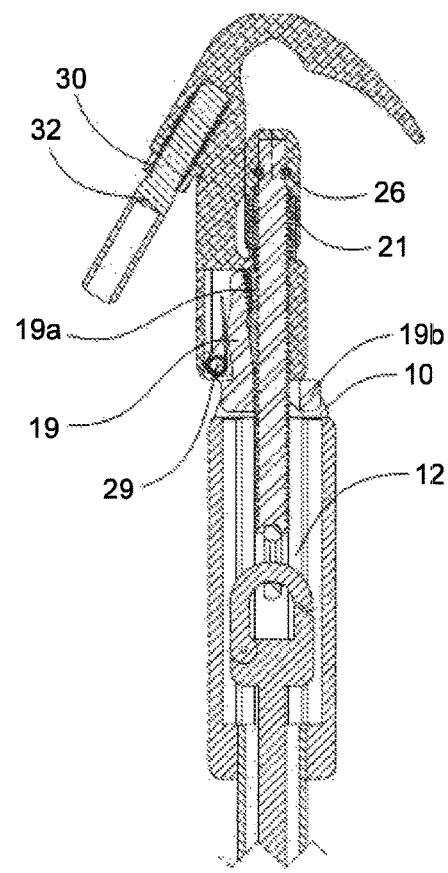
Figure 4C:
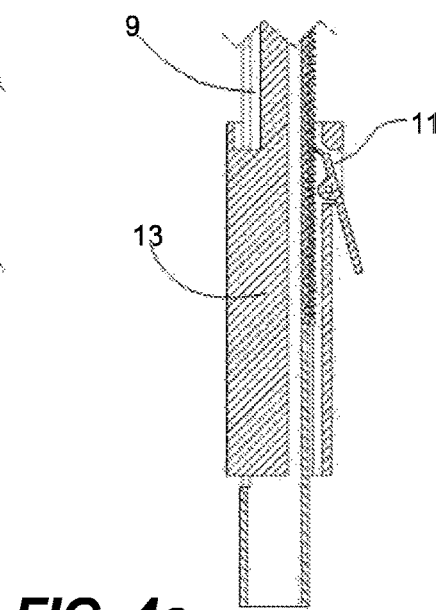

When the sliding handle 13 of the shotgun stick is pulled back, the grounding clamp eyelet is pulled by the articulating dynamic latching hook inside the plastic housing 10 and the hotstick mating surface 10a presses against the activator bar 19b, which rotates the activator about the pivot point at the axle 29, thereby compressing the leaf torsion spring and releasing the partially threaded pawl portion 19d from the threaded surface of eyebolt 20 [see FIG. 4c]. This also allows compression of a compression spring 21 disposed between an underside of a cylindrical opening in the lower jaw (or slider head) 22 and a lower platform 15d in the clamp body. The eyebolt rod will now slide within the throughbore in the clamp body lower portion, facilitating rapid movement of the slider head in either direction, toward the wire when installing the clamp and away from the wire when releasing the clamp.

Note should be made that the grounding clamp compression spring 21 is disposed concentrically around the threaded eyebolt rod 20 and captured inside the slider head 22 by two retainer pins 26 that allow free rotation of the spring within the head. The ratcheting trigger 11 maintains spring compression until it is released. When brought into engagement with the distribution lines of varying sizes, and when the ratcheting trigger is released, the threaded rod and slider head 22 spring forward against (and thereby clasp) the lines—typically lines from 1/8" up to 1" in diameter.

As can be seen, releasing the hotstick trigger releases the activator 19, moving the hotstick mating surface 10a away from the activator bar 19b, which then permits the activator to pivot on axis 29 as the leaf torsion spring 18 pushes the stem 19a of the activator toward the eyebolt rod 20. When urged in that direction, the partially threaded pawl 19d re-engages with the threaded rod 20 when the linear travel of the rod comes to its end point, which will depend on the diameter of the wire captured under the upper jaw 16 of the clamp body 15. It should be noted that the upper jaw 16 is a fixed jaw and does not articulate relative to the clamp body, unlike similar shaped clamp upper jaws of the duckbill type.

The slider head (functionally the lower jaw) 22 is adjustably positioned within the clamp body 15 by eyebolt 20 to define the available opening and downward travel (pivot range) of the upper jaw 16. Thus, when a very small conductor is to be grounded (see FIG. 3b), the eyebolt 20 will be turned to elevate the lower jaw and close the space between it and the upper jaw; when a much larger conductor is to be grounded (see FIG. 3a), the lower jaw can be lowered.

In operation, whatever distance the slider must travel, the number of rotations necessary to achieve sufficient torsion against a wire (e.g., 20 lbs/in$^2$) is always comparable to a 3/4 rotation or turn, (180 degrees of forearm supination×1½). Because woven aluminum wire compresses, it is important to allow for more rotations, if necessary, to further tighten the clamp on the wire.

No prior art clamps include the activator 19 having a bar 19b engaged by the hotstick to selectively engage or disengage a partially threaded pawl 19d portion from a selectively slidable eyebolt rod. The activator effectively engages the threaded eyebolt rod due to the geometry of its fulcrum position, wherein a downward force (a pull) of the hotstick urges the mating threads into engagement and prevents the pawl threads from releasing the rod threads. To release and disengage the threads, a mere quarter turn is sufficient for the pitched threads to push the activator out and away from the rod, reduce the tension, pivoting the engaged threads away from the threaded rod, and thereby allowing the slider to be pulled off and away from the wire. Absent the quarter turn, the geometry of the activator is such that there is too much pressure to disengage the threads.

This feature importantly distinguishes over prior art clamps, in as much as this "spring-loaded" effect enables the lineman to bypass multiple threads without having to turn the hotstick, and thus eliminates the need of the multiple turns typically required to bring the clamp into capturing engagement with the wire. Prior art duckbill clamps, while including a spring that urges the top bill against the wire, still require multiple rotations of the threaded rod before it arrives at the point of securing the duckbill snugly against the lower jaw, especially when transitioning from a large (e.g., 1-inch) diameter wire to a small (e.g., 1/8-inch) diameter wire.

Figure 5:
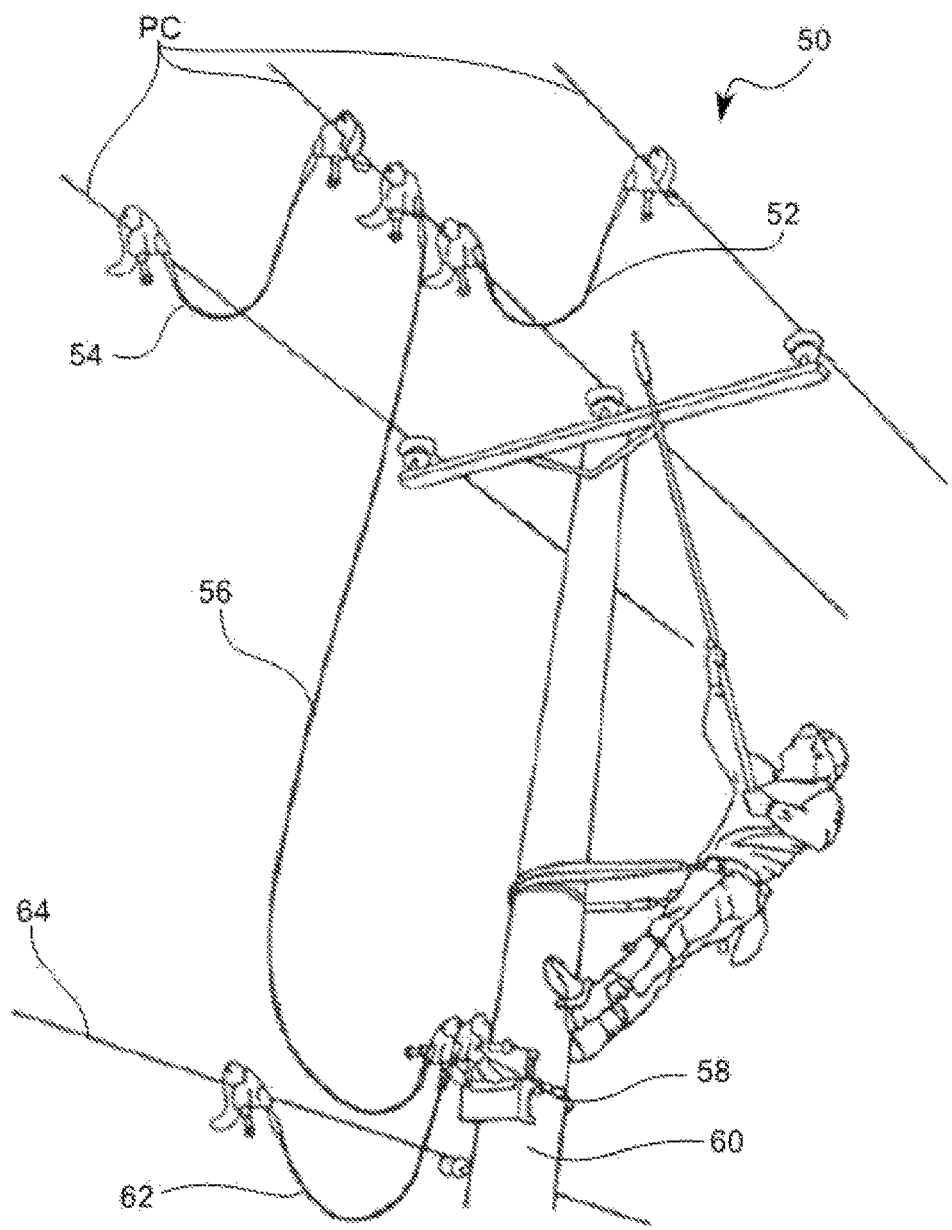
FIG. 5 is an upper side view showing an operator manipulating a hotstick during installation of an overhead grounding device.
Figure 6:
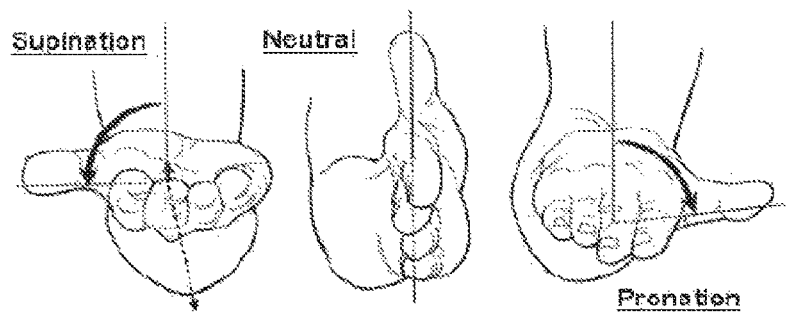
FIG. 6 is an anterior distal end view of a human forearm, showing some wrist movements involved in using the hot stick of FIG. 5 for the operations indicated.

Referring now to FIG. 5, there is shown a lineman working atop a power pole and installing a cluster set 50 of grounding clamps on a three-phase power distribution line. The cluster includes two paired grounding jumpers 52, 54, a first grounding cable 56 connected to a cluster bar 58 secured to the utility pole 60, and then, in turn, through a second grounding cable 62 to the neutral conductor 64 and thereby provide a path to ground.

What is claimed as invention is:
1. A grounding clamp configured for operative connection to a shotgun style non-conductive hotstick having a sliding handle and a dynamic latching hook for capturing and operably engaging an eyelet of a grounding clamp eyebolt, said grounding clamp comprising:
  a conductive clamp body having an integral lower body portion and an upper jaw, said lower body portion having a chamber for housing an activator and a spring, a throughbore for passage of a threaded rod, and a crimp style ring for terminating a ground cable;
  an eyebolt disposed through said throughbore, said eyebolt including a threaded rod with an upper end and an integral element on a lower end configured for insertion into a hotstick end to be captured by the hotstick dynamic latching hook;
  a slider head disposed on said upper end of said eyebolt;
  an activator pivotally disposed on an axle in said chamber and having a partially threaded pawl portion with threads that match and operatively engage said threaded rod, said activator having a lower portion disposed outside said lower body portion of said clamp body;
  a spring disposed in said chamber and engaging pawl to urge said partially threaded pawl portion into threadable engagement with said eyebolt threaded rod; and a compression spring axially disposed on said eyebolt threaded rod between said slider head and said lower body portion so as to urge said slider head upwardly toward said upper jaw;

wherein said partially threaded pawl portion is configured to selectively disengage from said eyebolt threaded rod when said hotstick sliding handle is pulled so as to press said lower bar of said activator and cause said activator to pivot on said axle.

2. The grounding clamp of claim 1, wherein when said partially threaded pawl portion engages said threaded rod, rotating said threaded rod at least ¼ turn will disengage said threaded rod from said partially threaded pawl portion so as to enable said threaded rod to slide in said throughbore in said clamp body.

3. The grounding clamp of claim 1, wherein said spring is a torsion spring.

4. The grounding clamp of claim 1, wherein said integral element of said eyebolt is an annular eyelet.

5. The grounding clamp of claim 1, wherein said activator is L-shaped and includes a stem having a partially threaded pawl portion with threads that match and operatively engage said threaded rod, and wherein said lower is a bar integral with said stem and having a hole through which said threaded rod passes.

6. The grounding clamp of claim 1, wherein disengagement of said partially threaded pawl portion from said threaded rod enables said eyebolt to slide within said throughbore.

7. The grounding clamp of claim 6, wherein said compression spring urges said slider head upwardly when said partially threaded pawl portion is disengaged from said threaded rod.

8. The grounding clamp of claim 1, wherein said slider head is secured on said eyebolt with retainer pins.

9. The grounding clamp of claim 8, wherein said slider head includes a cylindrical opening and said compression spring is disposed in said cylindrical opening.

10. The grounding clamp of claim 1, wherein said upper jaw is rigidly fixed to said clamp body.

11. A grounding clamp, comprising:
a conductive clamp body having an upper portion with an integral upper jaw and a lower portion having a through hole and an activator chamber;
an activator pivotally mounted on an axle in said activator chamber, said activator having an upper stem with a partially threaded surface and a lower bar disposed below said lower portion of said clamp body, said lower bar having a hole;
an eyebolt passing through said hole in said lower bar and said through hole in said lower portion of said clamp body, said eyebolt including a threaded rod having an upper end and a lower end;
a spring disposed in said activator chamber and configured to urge said upper stem of said eyebolt toward said threaded rod so as to bring said partially threaded surface of said activator into threaded engagement with said threaded rod;
a conductive head disposed on said upper end of said eyebolt;
a latching element on said lower end of said eyebolt configured to connect to a hotstick dynamic latch; and
a spring disposed between said lower portion of said clamp body and said slider head;
wherein pushing said lower bar of said activator upwardly and toward said clamp body disengages said activator from said threaded rod.

12. The grounding clamp of claim 11, wherein said activator and said threaded rod cooperate to enable selective sliding of said threaded rod in said through hole by depressing or releasing said lower bar, by rotating said threaded rod, or both.

13. The grounding clamp of claim 11, wherein said activator is configured, and said axle is positioned in relation to said activator, such that when said activator pivots on said axle under a downward force, said activator is urged more forcefully against said eyebolt rod.

14. The grounding clamp of claim 13, wherein said activator engaged against said eyebolt rod is released by a quarter turn of said eyebolt rod.

* * * * *